United States Patent
Dojo et al.

(10) Patent No.: US 12,104,039 B2
(45) Date of Patent: Oct. 1, 2024

(54) HYDROUS SILICA FOR RUBBER REINFORCING FILLERS AND RUBBER COMPOSITION CONTAINING HYDROUS SILICA

(71) Applicant: TOSOH SILICA CORPORATION, Yamaguchi (JP)

(72) Inventors: Masakazu Dojo, Yamaguchi (JP); Yuta Imabeppu, Yamaguchi (JP)

(73) Assignee: TOSOH SILICA CORPORATION (JP)

( * ) Notice: Subject to any disclaimer, the term of this patent is extended or adjusted under 35 U.S.C. 154(b) by 268 days.

(21) Appl. No.: 17/756,736

(22) PCT Filed: Feb. 3, 2021

(86) PCT No.: PCT/JP2021/003808
§ 371 (c)(1),
(2) Date: Jun. 1, 2022

(87) PCT Pub. No.: WO2021/157582
PCT Pub. Date: Aug. 12, 2021

(65) Prior Publication Data
US 2023/0002588 A1    Jan. 5, 2023

(30) Foreign Application Priority Data
Feb. 5, 2020    (JP) .................... 2020-017574

(51) Int. Cl.
*C08K 3/36*    (2006.01)

(52) U.S. Cl.
CPC .......... *C08K 3/36* (2013.01); *C08K 2201/003* (2013.01); *C08K 2201/006* (2013.01)

(58) Field of Classification Search
CPC ............... C01B 33/193; C01P 2004/61; C01P 2006/12; C01P 2006/14; C01P 2006/40; C08K 2003/2296; C08K 2201/003; C08K 2201/006; C08K 3/06; C08K 3/22; C08K 3/36; C08K 5/0025; C08K 5/09; C08K 5/18; C08K 5/31; C08K 5/47; C08K 5/548; C08K 3/34; C08L 7/00; C08L 91/00; C08L 21/00; Y02T 10/86
See application file for complete search history.

(56) References Cited

U.S. PATENT DOCUMENTS

| 5,234,673 | A | 8/1993 | McGill et al. |
| 7,250,463 | B2 | 7/2007 | Durel et al. |
| 11,208,331 | B2 | 12/2021 | Imabeppu et al. |
| 11,279,623 | B2 | 3/2022 | Imabeppu et al. |
| 2005/0032965 | A1* | 2/2005 | Valero ............ C08K 3/36 524/493 |
| 2008/0293871 | A1 | 11/2008 | Stenzel et al. |
| 2018/0141820 | A1 | 5/2018 | Zhang et al. |
| 2018/0163026 | A1 | 6/2018 | Blackman et al. |
| 2018/0215835 | A1 | 8/2018 | Nishihachijyo et al. |

FOREIGN PATENT DOCUMENTS

| CN | 1541186 A | 10/2004 |
| CN | 1541245 A | 10/2004 |
| CN | 1594408 A | 3/2005 |
| CN | 1871281 A | 11/2006 |
| CN | 101115785 A | 1/2008 |
| CN | 101959700 A | 1/2011 |
| CN | 102167337 A | 8/2011 |
| CN | 102491351 A | 6/2012 |
| CN | 102653603 A | 9/2012 |

(Continued)

OTHER PUBLICATIONS

First Office Action for corresponding Chinese application No. 202180006978.7; dated Jan. 30, 2024 (13 pages) Machine Translation.
International Search Report for International application No. PCT/JP2019/024672; dated Aug. 13, 2019 (8 pages).
Extended European Search Report and Written Opinion for corresponding European application No. 19848513.8; dated Sep. 20, 2021 (5 pages).
International Preliminary Report on Patentability (Chapter I) for corresponding International application No. PCT/JP2019/024672; dated Feb. 25, 2021; Machine Translation (11 pages).
International Preliminary Report on Patentability (Chapter I) for International application No. PCT/2019/024671; dated Feb. 25, 2021; Machine Translation (11 pages).
First Office Action for Chinese application No. 201980010493.8; dated Feb. 18, 2021 (9 pages) Machine Translation.
Non-Final Office Action for U.S. Appl. No. 16/976,709; dated Mar. 30, 2021 (9 pages).

(Continued)

*Primary Examiner* — Shuangyi Abu Ali
(74) *Attorney, Agent, or Firm* — Mendelsohn Dunleavy, P.C.

(57) ABSTRACT

The present invention relates to a hydrous silica for rubber reinforcing fillers having CTAB specific surface area in the range of 220 to 350 m$^2$/g and a pore volume over the range of pore radius 1.9 to 100 nm measured by mercury press-in method in the range of 1.7 to 2.0 cm$^3$/g, wherein a volume average particle diameter D50 in a volume particle size distribution measured by laser diffraction method for the slurry obtained by dispersing 50 ml of a hydrous silica slurry adjusted to 4 mass % with an ultrasonic homogenizer at an output of 140 W for 10 minutes is in the range of 5.0 to 12.0 μm, and a cumulative value of hydrous silica particles over the range of 4.0 to 35.0 μm in the volume particle size distribution is 80% or more. The present invention also relates to a rubber composition containing the above-mentioned hydrous silica and a rubber component containing a natural rubber. The present invention provides a hydrous silica which has equivalent or excellent reinforcing property (abrasion resistance, tensile strength) and which allows to greatly reduce the rolling resistance when it is blended into a rubber based on the natural rubber for TBRs, which is often used under a heavy load, compared with conventional hydrous silicas, and provides the rubber composition containing the hydrous silica.

20 Claims, No Drawings

(56) References Cited

FOREIGN PATENT DOCUMENTS

| | | |
|---|---|---|
| CN | 102947379 A | 2/2013 |
| CN | 104271658 A | 1/2015 |
| CN | 107636058 A | 1/2018 |
| CN | 107709438 A | 2/2018 |
| CN | 110719892 A | 1/2020 |
| DE | 102006060357 A1 | 7/2007 |
| EP | 0723259 A1 | 7/1996 |
| EP | 1762544 A1 | 3/2007 |
| JP | H09-87433 A | 3/1997 |
| JP | H10-194722 A | 7/1998 |
| JP | H11-157826 A | 6/1999 |
| JP | H11-228125 A | 8/1999 |
| JP | H11-240982 A | 9/1999 |
| JP | 2000-072434 A | 3/2000 |
| JP | 2005-534609 A | 11/2005 |
| JP | 2011-516630 A | 5/2011 |
| JP | 2011-252108 A | 12/2011 |
| JP | 2012-017440 A | 1/2012 |
| JP | 2013-166862 A | 8/2013 |
| JP | 2017-002210 A | 1/2017 |
| JP | 2017-514773 A | 6/2017 |
| JP | 2018-151033 A | 9/2018 |
| JP | 2019-56068 A | 4/2019 |
| WO | 2016199429 A1 | 12/2016 |
| WO | 2016199744 A1 | 12/2016 |
| WO | 2020031522 A1 | 2/2020 |
| WO | 2020031523 A1 | 2/2020 |

OTHER PUBLICATIONS

Examination Report for Indian application No. 202027035499; dated Mar. 31, 2021 (5 pages).

Office Action for Indian patent application No. 202027035499; dated Oct. 8, 2021 (2 pages).

Notice of Reasons for Revocation for corresponding Japanese application No. 2018-151034; dated Oct. 29, 2021 (28 pages) Machine Translation.

First Office Action for Chinese application No. 201980041332.5 dated May 28, 2021 (13 pages) Machine Translation.

Notice of Opposition for Japanese Patent Application No. 2018-151034; dated Jul. 12, 2021 (67 pages) Machine Translation.

Non-Final Office Action for U.S. Appl. No. 17/253,999; dated Jul. 21, 2021 (11 pages).

International Search Report for International application No. PCT/JP2019/024671; dated Aug. 13, 2019 (10 pages).

International Search Report and Written Opinion for corresponding International application No. PCT/JP2021/003808; dated Apr. 20, 2021 (12 pages) Machine Translation.

International Preliminary Report on Patentability for corresponding International application No. PCT/JP2021/003808; dated Jul. 28, 2022 (11 pages) Machine Translation.

Decision to Grant a Patent for corresponding Japanese application No. 2020-017574; dated Apr. 2, 2024 (5 pages) Machine Translation.

Notice of Reasons for Refusal for corresponding Japanese Application No. 2020-017574; dated Dec. 19, 2023 (8 pages) Machine Translation.

Office Action for corresponding Vietnamese application No. 1-2022-03850; dated Mar. 29, 2024 (3 pages).

Extended European Search Report for corresponding European application No. 21750638.5; dated Apr. 29, 2024 (9 pages).

Office Action for corresponding Indonesian application No. P00202207035; dated May 16, 2024 (8 pages) Machine Translation.

Office Action for corresponding Korean application No. 10-2022-7020991; dated May 23, 2024 (8 pages) Machine Translation.

\* cited by examiner

HYDROUS SILICA FOR RUBBER REINFORCING FILLERS AND RUBBER COMPOSITION CONTAINING HYDROUS SILICA

TECHNICAL FIELD

The present invention relates to a hydrous silica for rubber reinforcing fillers and a rubber composition containing the hydrous silica.

CROSS REFERENCE TO RELATED APPLICATIONS

This application claims priority to Japanese Patent Application No. 2020-017574, filed on Feb. 5, 2020, the entire disclosure of which is specifically incorporated herein by reference.

BACKGROUND ART

It is a well-known feature that additions of the hydrous silica to tire tread portions allow to reduce rolling resistance with a road surface during driving, and in passenger car tires (PCRs), tires blended with the hydrous silica are becoming widespread. On the other hand, tires used under a heavy load, such as for trucks and buses (TBRs), emphasize the reinforcing property and durability under the heavy load rather than the reduction of the rolling resistance. Therefore, many of the conventional TBRs have carbon black blended into a natural rubber which can obtain good the reinforcing property and durability, and the blending of the hydrous silica is small.

In recent years, from viewpoint of environmental problems, there has been an increasing demand for the reduction of the rolling resistance not only for PCRs but also for TBRs, and there is a demand for development of the hydrous silica suitable for TBRs containing the natural rubber as main component.

For example, Patent Literature 1 discloses the hydrous silica suitable for reinforcing fillers for polymers, particularly for tires. Furthermore, for example, Patent Literature 2 discloses a rubber composition for the heavy load tire excellent in abrasion resistance and low rolling resistance.

Patent Literature 1: Published Japanese Translation No. 2017-514773 of PCT International Publication WO2015/121332.

Patent Literature 2: Japanese Patent Publication No. 2019-56068.

The entire description of Patent Literatures 1 and 2 is specifically incorporated herein by reference.

BRIEF DESCRIPTION OF THE INVENTION

As described above, the TBRs are usually blended with the natural rubber as main component since the reinforcing property and durability under the heavy load are emphasized. When the present inventors experimentally produced a natural rubber composition containing the hydrous silica blended therein for the purpose of reducing the rolling resistance, they found the following problems compared with a rubber composition for PCRs blended with the hydrous silica.

(1) When a conventional hydrous silica was blended into the natural rubber, rolling resistance could be reduced compared with the case where only carbon black was blended. However, the natural rubber composition blended with the hydrous silica has an inferior reinforcing property compared with the natural rubber composition blended with only carbon black since the hydrous silica has a poor compatibility with the natural rubber and causes a poor dispersion in the rubber. Therefore, the present inventors have considered that the dispersibility of the hydrous silica in the natural rubber needs to be improved to obtain good reinforcing property.

(2) When sufficient mixing dispersion was performed by applying a high shear force (shear) at the time of mixing and taking time for mixing in order to disperse the hydrous silica in the natural rubber, the effect of reducing the rolling resistance was reduced. The possible cause of this was that when the sufficient mixing dispersion is performed, most of the hydrous silica is excessively dispersed in the natural rubber, and the primary particles or the aggregated particles of the hydrous silica become too close to each other, resulting in greater interaction between the particles.

(3) In the method described in Patent Literature 1, an aluminum compound is added in producing the hydrous silica. The hydrous silica containing aluminum has features of a strong aggregation structure and a poor dispersibility. Therefore, even when the strong shear force (shear) is applied, no excessive dispersion in the natural rubber is observed, and a reducing effect on the rolling resistance is observed. However, the reinforcing property (abrasion resistance, tensile strength) and workability (mooney viscosity) tended to deteriorate due to residual particles that are difficult to disperse.

(4) Patent Literature 2 discloses a method for producing a load tire excellent in abrasion resistance and low rolling resistance (tan $\delta$) by blending 40 to 60 parts by mass of a hydrous silica having CTAB adsorption specific surface area of 180 to 300 m$^2$/g, 3 to 10 parts by mass of carbon black and a silane coupling agent in an amount of 6 to 15 mass % relative to an amount of the hydrous silica into 100 parts by mass of a rubber component consisting of 55 to 70 mass % of a natural rubber and 30 to 45 mass % of a butadiene rubber and undergoing a mixing step, a roll step and a final step. This method provides rubber compositions which are excellent in abrasion resistance and low rolling resistance than conventional products. However, the above method needs to undergo many steps including uses of special mixing machines and temperature controls.

An object of the present invention is to provide a hydrous silica which has equivalent or excellent reinforcing property (abrasion resistance, tensile strength) and which allows to greatly reduce the rolling resistance when it is blended into the rubber based on the natural rubber for TBRs, which is often used under the heavy load, compared with conventional hydrous silicas. Another object of the present invention is to provide a hydrous silica which has excellent reinforcing property (abrasion resistance, tensile strength) and which allows to reduce the rolling resistance when blended into the rubber based on the natural rubber for TBRs, compared with the hydrous silica described in Patent Literature 1.

In order to solve the above problems and achieve the object of the present invention, the present inventors have intensively studied to provide a hydrous silica which allows to improve the reinforcing property (abrasion resistance, tensile strength) and allows to reduce the rolling resistance in the rubber composition obtained by blending the hydrous silica into the rubber based on the natural rubber for TBRs, which is often used under the heavy load.

As a result, the present inventors found that: a hydrous silica having CTAB specific surface area in the range of 220 to 350 m²/g and a pore volume over the range of pore radius 1.9 to 100 nm measured by mercury press-in method in the range of 1.7 to 2.0 cm³/g, wherein a volume average particle diameter D50 in a volume particle size distribution measured by laser diffraction method for the slurry obtained by dispersing 50 ml of a hydrous silica slurry adjusted to 4 mass % with an ultrasonic homogenizer at an output of 140 W for 10 minutes is in the range of 5.0 to 12.0 μm, and a cumulative value of hydrous silica particles over the range of 4.0 to 35.0 μm in the volume particle size distribution is 80% or more, allows to maintain or improve the reinforcing property (abrasion resistance, tensile strength) and allows to reduce the rolling resistance since adequate dispersion is obtained even if the hydrous silica blended into the rubber including the natural rubber as main component. Furthermore, a method for producing such a hydrous silica has also been newly established and the present invention has been completed.

The present invention is as follows.

[1]

A hydrous silica for rubber reinforcing fillers having CTAB specific surface area in the range of 220 to 350 m²/g and a pore volume over the range of pore radius 1.9 to 100 nm measured by mercury press-in method in the range of 1.7 to 2.0 cm³/g, wherein a volume average particle diameter D50 in a volume particle size distribution measured by laser diffraction method for the slurry obtained by dispersing 50 ml of a hydrous silica slurry adjusted to 4 mass % with an ultrasonic homogenizer at an output of 140 W for 10 minutes is in the range of 5.0 to 12.0 μm, and a cumulative value of hydrous silica particles over the range of 4.0 to 35.0 μm in the volume particle size distribution is 80% or more.

[2]

The hydrous silica for rubber reinforcing fillers according to [1], wherein the D50 is 7.0 to 12.0 μm and the cumulative value of hydrous silica particles over the range of 4.0 to 35.0 μm in the volume particle size distribution is 85% or more.

[3]

The hydrous silica for rubber reinforcing fillers according to [1] or [2], wherein BET specific surface area is in the range of 230 to 350 m²/g.

[4]

The hydrous silica for rubber reinforcing fillers according to any one of [1] to [3], wherein pH of the 4 mass % slurry is in the range of 5 to 8, an electrical conductivity of the filtrate of the slurry is 1,000 μS/cm or less, and a water content is 9% or less.

[5]

The hydrous silica for rubber reinforcing fillers according to any one of [1] to [4], which is for reinforcing and filling the rubber of a rubber component containing a natural rubber.

[6]

A rubber composition containing the hydrous silica according to any one of [1] to [4] and a rubber component containing a natural rubber.

[7]

The rubber composition according to [6], wherein the rubber component contains 70 mass % or more of the natural rubber.

[8]

The rubber composition according to [6] or [7], which contains 5 to 100 parts by mass of the hydrous silica per 100 parts by mass of the rubber component.

Effects of the Invention

The hydrous silica for rubber reinforcing fillers of the present invention (hereinafter, referred to as a "hydrous silica of the present invention") has a certain range of pore volume in an area where CTAB specific surface area is high and can obtain an appropriate dispersibility in a natural rubber. Therefore, the rolling resistance can be reduced, and simultaneously the reinforcing property (abrasion resistance and tensile strength) can be maintained or improved as compared with the hydrous silica of the conventional product. Furthermore, the rolling resistance can be reduced, and simultaneously the reinforcing property (abrasion resistance and tensile strength) can also be improved as compared with the hydrous silica described in Patent Literature 1. Especially when the rubber composition containing the hydrous silica of the present invention is used in the TBRs tread portion used under the heavy load, an effect of reducing the rolling resistance is obtained so that a tire which is friendly to the environment can be manufactured.

EMBODIMENTS FOR IMPLEMENTING THE INVENTION

<Hydrated Silica for Rubber Reinforcing Fillers>

The hydrous silica of the present invention is a hydrous silica having CTAB specific surface area in the range of 220 to 350 m²/g and a pore volume over the range of pore radius 1.9 to 100 nm measured by mercury press-in method in the range of 1.7 to 2.0 cm³/g, wherein a volume average particle diameter D50 in a volume particle size distribution measured by laser diffraction method for the slurry obtained by dispersing 50 ml of a hydrous silica slurry adjusted to 4 mass % with an ultrasonic homogenizer at an output of 140 W for 10 minutes is in the range of 5.0 to 12.0 μm, and a cumulative value of hydrous silica particles over the range of 4.0 to 35.0 μm in the volume particle size distribution is 80% or more.

The hydrous silica of the present invention has CTAB specific surface area in the range of 220 to 350 m²/g. CTAB specific surface area is measured based on JIS-K6430 (Rubber compounding ingredients-Silica-Test methods). CTAB is an abbreviation for Cetyl Tri-methyl Ammonium Bromide, which is one kind of surfactants, and CTAB specific surface area means a specific surface area (m²/g) when CTAB is adsorbed. CTAB specific surface area in the hydrous silica is considered as an index of specific surface area involved in the interaction with rubber molecules. A sufficient rubber reinforcing property (abrasion resistance and tensile strength) cannot be obtained when CTAB specific surface area of the hydrous silica is less than the lower limit of 220 m²/g in the present invention. A production of the hydrous silica is substantially difficult when CTAB specific surface area of the hydrous silica exceeds the upper limit of 350 m²/g in the present invention. CTAB specific surface area of the hydrous silica of the present invention is preferably in the range of 220 to 300 m²/g, and even more preferably in the range of 220 to 270 m²/g from the viewpoint of the rubber reinforcing property (abrasion resistance, tensile strength).

The hydrous silica of the present invention has the pore volume over the range of pore radius 1.9 to 100 nm measured by mercury press-in method in the range of 1.7 to 2.0 cm³/g. Pores with pore radii in the range of 1.9 to 100 nm, as measured by mercury press-in method, are pores with sizes that allow easy penetration of rubber molecules. When the pore volume over the range of pore radius 1.9 to 100 nm measured by mercury press-in method is less than the lower limit 1.7 cm³/g in the present invention, the hydrous silica of the present invention cannot obtain sufficient reinforcing property. When the pore volume of the hydrous silica exceeds the upper limit 2.0 cm³/g in the present invention, a production of the hydrous silica is substantially difficult. The pore volume over the range of pore radius 1.9 to 100 nm measured by mercury press-in method is preferably in the range of 1.75 to 1.95 cm³/g.

The hydrous silica of the present invention has a volume average particle diameter D50 in a volume particle size distribution measured by laser diffraction method for the slurry obtained by dispersing 50 ml of a hydrous silica slurry adjusted to 4 mass % with an ultrasonic homogenizer at an output of 140 W for 10 minutes in the range of 5.0 to 12.0 μm. The hydrous silica for rubber reinforcing fillers is generally mixed and dispersed with a raw rubber, carbon black, or other additives using a banbury mixer or a mixing roll. The inventors found that the dispersion state of the hydrous silica when dispersed in the natural rubber can be approximated to the volume particle size distribution measured by laser diffraction method for the slurry obtained by dispersing 50 ml of the hydrous silica slurry adjusted to 4 mass % with the ultrasonic homogenizer at the output of 140 W for 10 minutes, based on the measurements of the mechanical energy amount when mixed and dispersed into the natural rubber and of the dispersion state of the hydrous silica when actually dispersed into the natural rubber. Furthermore, the present inventors found that when the volume average particle diameter D50 measured under this condition is in the range of 5.0 to 12.0 μm and the cumulative value of the hydrous silica particles over the range of 4.0 to 35.0 μm in the volume particle size distribution is 80% or more, the hydrous silica can solve the problem of the present invention and achieve the purpose. Hereinafter, unless otherwise specified, the "volume particle size distribution" in the specification indicates a volume particle size distribution measured by laser diffraction method for the hydrous silica in the slurry obtained by dispersing 50 ml of the hydrous silica slurry adjusted to 4 mass % with the ultrasonic homogenizer at the output of 140 W for 10 minutes.

When the volume average particle diameter D50 in the volume particle size distribution is in the range of 5.0 to 12.0 μm, the hydrous silica can be moderately dispersed in the natural rubber. When D50 is less than 5.0 μm, the hydrous silica excessively disperses in the natural rubber, the primary particles or the aggregated particles are too close to each other, and thereby the interaction between the particles becomes large (cause of heat generation), and the effect of reducing the rolling resistance becomes small. When D50 exceeds 12.0 μm, the reinforcing property deteriorates since the hydrous silica causes the poor dispersion in the natural rubber. The volume average particle diameter D50 is preferably in the range of 6.0 to 12.0 μm, more preferably in the range of 7.0 to 12.0 μm.

The cumulative value of 80% or more of the hydrous silica particles over the range of 4.0 to 35.0 μm in the volume particle size distribution indicates a sharper volume particle size distribution. In other words, the fact that the amounts of fine particles and coarse particles are small is indicated. Since D50 is the volume average of particle size and indicates the point at which the accumulation reaches 50%, it is not possible to define whether the volume particle size distribution of the particle is sharp or broad by simply specifying the value as being in the range of 5.0 to 12.0 μm. Therefore, the present invention combines the features of that D50 in the volume particle size distribution is 5.0 to 12.0 μm and that the cumulative value of the hydrous silica particles over the range of 4.0 to 35.0 μm in this volume particle size distribution is 80% or more, thereby defining that the volume particle size distribution is sharp while the target volume average particle diameter is obtained.

When the cumulative value of the hydrous silica particles over the range of 4.0 to 35.0 μm in the volume particle size distribution is less than 80%, the proportion of fine particles or coarse particles increases, which leads to deterioration of physical properties in incorporating into the natural rubber. When too many fine particles are present, the rolling resistance tends to worsen. When too many coarse particles are present, there is a tendency for the poor dispersion and reduced reinforcing properties (especially reduced abrasion resistance). From such viewpoint, the cumulative value of the hydrous silica particles over the range of 4.0 to 35.0 μm in the volume particle size distribution is preferably 80% or more, more preferably 85% or more.

The hydrous silica of the present invention preferably has BET specific surface area in the range of 230 to 350 m²/g. When 230 m²/g or more is achieved, sufficient reinforcing property (abrasion resistance, tensile strength) can be obtained. When BET specific surface area increases, the production of the hydrous silica tends to be difficult, but the production of the hydrous silica is sufficiently feasible as long as BET specific surface area is 350 m²/g or less. The range of BET specific surface area is preferably from 230 to 330 m²/g, more preferably from 230 to 320 m²/g.

The hydrous silica of the present invention preferably has pH of the 4 mass % slurry in the range of 5 to 8, an electrical conductivity of the filtrate of the slurry of 1,000 μS/cm or less, and a water content of less than 9%. When the electrical conductivity is less than 1,000 μS/cm, aggregations over time hardly occur, more preferably less than 800 μS/cm, and even more preferably less than 500 μS/cm.

The hydrous silica of the present invention preferably has pH of the 4 mass % slurry in the range of 5 to 8, which is equivalent to pH of a general hydrous silica. When pH is within this range, good vulcanization characteristics and reinforcing property can be obtained.

The water content of less than 9% is appropriate for the hydrous silica of the present invention, which is almost equivalent to the water content of the general hydrous silica. When the water content is within this range, good vulcanization characteristics and reinforcing property can be obtained. The electrical conductivity and pH can be controlled in the water washing process in the producing process, and the water content can be controlled in the drying process.

The hydrous silica of the present invention is suitable for reinforcing fillers used for the rubber component containing the natural rubber. The rubber component containing the natural rubber may be, for example, a rubber component containing 70 mass % or more of the natural rubber. However, this should not be construed as a limitation to the preceding. The hydrous silica of the present invention may contain, for example, 5 to 100 parts by mass of the hydrous silica per 100 parts by mass of the rubber component containing the natural rubber to provide reinforcing and filling of the rubber component.

<Additive Components to Hydrous Silica>

If the hydrous silica of the present invention satisfies the above conditions, additives (e.g., surfactant, silane coupling agent, or the like) may also be added. The additives may be added to the hydrous silica for the purpose of obtaining good processability (Mooney viscosity reduction) and vulcanization characteristics of the rubber composition. When the additives are added, the addition may be performed in the extent that the effects of blending the hydrous silicic acid of the present invention are not impaired.

<Method for Producing Hydrous Silica>

The hydrous silica of the present invention is a hydrous silica newly developed by the present inventors so as to be suitable for blending into the rubber component containing the natural rubber as main component. The hydrous silica of the present invention can be produced, for example, through the steps of i) to v) exemplified below. However, the present invention is not limited to this.

i) a charge step of adjusting water and an aqueous alkali silicate solution controlled to reach a predetermined temperature (e.g., 40 to 80° C.; a reaction temperature of a neutralization reaction starting immediately thereafter) so as to have a predetermined pH (e.g., pH 10.5 to 12.0; a pH during the reaction of the neutralization reaction starting immediately thereafter);

ii-1) a neutralization reaction step in which only a mineral acid is dropped while keeping the reaction temperature (e.g., 40 to 80° C. or 60 to 95° C.) so as to control pH to, for example, 9.5 to 11.0 [provided that pH in step i)>pH in step ii-1)];

ii-2) a step of raising the temperature to, for example, 60 to 95° C. without adding any of the aqueous alkali silicate solution and mineral acid [provided that the temperature in step i)<the temperature in step ii-2)];

ii-3) a neutralization reaction step in which the aqueous alkali silicate solution and the mineral acid are simultaneously dropped while keeping the reaction temperature (e.g., 40 to 80° C. or 60 to 95° C.) and pH (e.g., pH 10.5 to12.0 or 9.5 to 11.0).

However, the order of the steps ii-1) to ii-3) is in random order. For example, a neutralization reaction step in which the aqueous alkali silicate solution is not added and only the mineral acid is dropped may be performed in any one of the first half, the middle half, and the latter half of step ii-1) to ii-3).

iii) a step of dropping only the mineral acid without dropping the aqueous alkali silicate solution until, for example, pH<7 to stop the neutralization reaction.

Wherein the steps i) to iii) are preferably performed while the neutralization reaction slurry (hydrous silica slurry) is stirred and/or circulated.

iv) a step of filtering the resulting hydrous silica slurry and washing it with water to obtain hydrous silica cakes.

v) a drying step of adjusting the water content of the hydrous silica.

The kind of the aqueous alkali silicate solution is not particularly limited, and for example, a commercially available aqueous alkali silicate solution may be used. The mineral acid is not particularly limited, but is preferably sulfuric acid, and any of dilute sulfuric acid and concentrated sulfuric acid may be used.

Step i) is a preparation step for making CTAB specific surface area to 220 m$^2$/g or more, a preparation step for forming the pore volume with pore radius of 1.9 to 100 nm, and a preparation step for forming the hydrous silica having the volume average particle diameter D50 in the volume particle size distribution in the range of 5.0 to 12.0 μm and the cumulative value of the hydrous silica particles over the range of 4.0 to 35.0 μm in the volume particle size distribution of 80% or more. In step i), for example, a commercially available aqueous alkali silicate solution is diluted with water to adjust to the predetermined pH. If the pH can be maintained within the predetermined range, other compounds such as salts may be added or not.

Steps ii-1) to ii-3) are key steps in obtaining the desired hydrous silica, in which the reaction temperature, the flow rate of the aqueous alkali silicate solution, and the flow rate of the mineral acid are controlled within the predetermined range. With respect to the flow rates of the mineral acid in steps ii-1) and ii-3), preferably the flow rate in step ii-1)>the flow rate in step ii-3).

Furthermore, each step of steps ii-1) to ii-3) may be performed twice or more. That is, for example, any one of steps ii-1) to ii-3) may be performed at first, and then, the one of steps ii-1) to ii-3) may be performed again without proceeding to step iii), and thereafter, the process may proceed to step iii). Each step of steps ii-1) to ii-3) may be performed, for example, twice, three times, or four times.

In steps i) to iii), the hydrous silica is kept to pH 7 or more, preferably pH 9.5 to 12.0, more preferably pH 9.5 to 11.5 at all times until the neutralization reaction is stopped [up to step ii) above]. In addition, in steps i) to iii), it is appropriate to perform one or both of stirring and circulating of the neutralization reaction slurry.

The step of stopping the neutralization reaction in step iii) is performed by dropping only the mineral acid until pH<7.

Filtering and water washing of the hydrous silica slurry in step iv) may be performed, for example, by a filter press or the like. A filter press with a pressing function may be used to apply squeeze after the water washing.

Step v) is the drying step of controlling the water content to be in the predetermined numerical value. The method of the drying step is not particularly limited, and specific examples may be static drying methods or methods controlled by commercially available dryers such as spray dryers and spin flush dryers.

Incidentally, the hydrous silicate obtained in the drying step of step v) may be applied a consolidation molding as necessary. In the consolidation molding, a molding machine by a commercially available dry method may be used, and a specific consolidation molding method is not particularly limited.

<Use of Additives>

Additives (surfactant, silane coupling agent, or the like) for improving the reinforcing property (abrasion resistance, tensile strength) of the rubber composition may be added in any one of steps i) to v). An example method of adding the additives may be a method of adding water to the hydrous silica cake obtained in step iv) to re-slurry it, adding the additives, and then drying it with a spray dryer or the like.

<Rubber Composition>

The present invention encompasses rubber compositions containing the hydrous silica of the present invention and the rubber component containing the natural rubber. The rubber component containing the natural rubber may be, for example, a rubber component containing 70 mass % or more of the natural rubber. When the content of the natural rubber is 70 mass % or more, the reinforcing property under the heavy load is apt to be exhibited. As long as the content of the natural rubber is 70 mass % or more, the type of the rubber component in the remaining portion is not limited. One or more kinds of (or a plurality of) various rubbers described below may be blended.

The rubber composition of the present invention may be a rubber composition containing 5 to 100 parts by mass of the hydrous silica of the present invention per 100 parts by mass of the rubber component containing 70 mass % or more of the natural rubber. When the hydrous silica of the present invention is 5 parts by mass or more, sufficient performance (the reinforcing property and rolling resistance) can be exhibited. On the other hand, when the hydrous silica of the present invention exceeds 100 parts by mass, the blending into the natural rubber becomes difficult and the rolling resistance may deteriorate, therefore it is preferably 100 parts by mass or less. The content of the hydrous silica of the present invention is preferably 10 to 70 parts by mass, and more preferably 15 to 60 parts by mass, per 100 parts by mass of the rubber component.

Applications of the rubber composition containing the hydrous silica of the present invention may include tread and side portions of tires and industrial articles. It is preferable to use the hydrous silica of the present invention alone, although other hydrous silicas may be blended as long as main component of the hydrous silica is the hydrous silica of the present invention.

Other rubbers may be blended into the rubber component as long as the natural rubber is 70 mass % or more. Examples of other rubbers that may be blended into the natural rubber include one or more kinds from butadiene rubber (BR), styrene-butadiene rubber (SBR), synthetic isoprene rubber (IR), ethylene-propylene diene rubber (EPDM), or the like. Butadiene rubber (BR) and styrene-butadiene rubber (SBR) are more preferable. Furthermore, these rubbers may also be terminally modified.

Other additives may be appropriately blended into the rubber composition, and there is no particular limitation on the kind thereof.

In addition to the hydrous silica, the rubber composition of the present invention may be suitably blended with carbon black, silane coupling agent, thermoplastic resin, softener, anti-aging agent, vulcanizing agent, vulcanization accelerator, vulcanization accelerating aid, activator, and the like commonly used, as necessary.

Carbon black may be used as it is, which is used for reinforcing filler in ordinary rubber compositions. The blending amount of carbon black is, for example, in the range of 20 to 100 parts by mass per 100 parts by mass of the rubber component.

As to the silane coupling agents, sulfide-based, mercapto-based, amine-based, vinyl-based, still-based, epoxy-based, and isocyanate-based may be used. The blending amount is preferably 25 parts by mass or less, more preferably 5 to 20 parts by mass, based on the mass of the hydrous silica to be blended. Sulfurcontain coupling agents, such as sulfide or mercapto-based, are more preferably used in terms of improvement of the reinforcing property for the rubber composition and the like.

Mineral oil-based softener, vegetable oil-based softener, and synthetic softener may be used as the softener for the purpose of improving the processability (Mooney viscosity) of the rubber composition. The amount of the softener to be blended is preferably 1 to 50 parts by mass, more preferably 5 to 30 parts by mass.

As to the vulcanizing agent, sulfur-based, peroxide-based and the like may be used, and the sulfur-based vulcanizing agent is more preferably used in terms of improving the reinforcing property for the rubber composition.

As to the vulcanization accelerator, for example, thiazole-based, sulfenamide-based, guanidine-based, thiourea-based, thiraum-based, dithiocarbamate-based, xanthate-based, and aldehyde amine-based and the like may be used. Two or more of these vulcanization accelerators are preferably blended. As to the vulcanization accelerating aid, zinc oxide and fatty acids such as stearic acid may be used.

As to the thermoplastic resin, for example, rosin, terpene resin, C5-based petroleum resin, C9-based petroleum resin, C5/C9-based petroleum resin, coumarone indene resin, indene resin, phenolic resin, α-methylstyrene resin and the like may be used.

As to the anti-aging agent, secondary anti-aging agents such as sulfur-based and phosphate-based, wax and the like may be used in addition to anti-aging agents such as amine-based and phenol-based.

The rubber composition containing the hydrous silica of the present invention can be suitably used for rubber products such as tires (particularly TBRs), conveyer belts, rubber rolls, and the like, and the rubber products such as tires, conveyor belts, rubber rolls, and the like, which become products, have excellent reinforcing properties and excellent rolling resistance. Furthermore, the pneumatic tire made of the rubber composition containing the hydrous silica of the present invention may be a tire obtained by using the above rubber composition for the tire tread portion, and the pneumatic tire excellent in reinforcing properties and rolling resistance of the tire tread portion can be obtained.

EXAMPLES

Hereinafter, the present invention will be described in more detail on the basis of examples. However, the examples are illustrative of the present invention, and the present invention is not intended to be limited to the examples.

Measurement Method for the Physical Properties of the Hydrous Silica

<BET Specific Surface Area ($N_2$ Method Specific Surface Area)>

The measurement was performed by the one-point method using a fully automated specific surface area measuring device (model: Macsorb® HM model-1201; manufactured by Mountec Co.).

<CTAB Specific Surface Area>

The measurement was performed based on JIS-K6430 (Rubber compounding agent-silica-test methods).

Wherein, the adsorption cross-sectional area of CTAB molecules was considered as 35 $Å^2$ in calculations.

<Pore Volume Measured by Mercury Press-in Method [Pore Radius 1.9 to 100 nm]>

The pressure was raised from the normal pressure to the maximum pressure 400 MPa using a mercury porosimeter (model: PASCAL 440 manufactured by ThermoQuest Co.), and a mercury pore distribution in the range of pore radius 1.9 nm to 6,400 nm and pore volume were measured. The measurement result is the pore distribution and pore volume measured at the time of rising pressure (from the larger pore volume). The obtained measurement result was analyzed by the attached software, and the pore volume over 1.9 to 100 nm was calculated.

<Volume Average Particle Diameter D50 and Cumulative Value of Volume Distribution for 10-Minute Dispersed Slurry>

The volume particle size distribution of the following sample was obtained using a laser diffractive particle size distribution measuring device (model: Microtrack MT-3000 II; manufactured by Microtrack-Bell Co.), and a value of 50% of the volume integrated value in the obtained volume particle size distribution (D50) and a cumulative value of the hydrous silica particles over the range of 4.0 to 35.0 μm were obtained. Note that the sample is slurry obtained by dispersing 50 ml of a hydrous silica slurry adjusted to 4 mass % with pure water, with an ultrasonic homogenizer (Model: Sonfier 250D; manufactured by BRANSON Co.) at an output of 140 W for 10 minutes.

<pH>

Based on JIS K 5101-17-2 (pigment test method), pH of the slurry adjusted to 4 mass % with pure water was measured by a commercially available glass electrode pH meter (Model: F-53; manufactured by Horiba Co.) as a stable value of an indicated value.

<Electrical Conductivity>

4 g of the hydrous silica (loss on heating after drying at 105° C. for 2 hours was 6% or less) was added into 50 ml of distilled water, mixed well, and then subjected to boiling treatment for 5 minutes. Thereafter, the total volume was adjusted to 100 ml using distilled water, and then filtered off, and the filtrate was measured using an electric conductivity meter (Model: CM30R; manufactured by Toa DKK Co.).

<Water Content>

Based on JIS K 5101-15-1 (Pigment Test Method), it was measured from the weight loss value after drying at 105° C. for 2 hours.

Method for Preparing Rubber Formulation and Methods for Measuring Related Physical Properties <Method for Preparing Formulation>

A sample for rubber test was prepared by the following mixing procedure according to the composition shown in Table 1.

(i) A commercially available natural rubber (NR #1 manufactured by JSR Co.) was masticated using an 8-inch open roll.

(ii) 700 g of the natural rubber prepared in (i) was subjected to masticating for 30 seconds in a 1.7 liter banbury mixer (manufactured by Kobe Steel Co.), and the additive A shown in Table 1 was added, and the ram pressure and the number of revolutions were adjusted so that the temperature of the rubber formulation at the time of taking out was 140 to 150° C., and the mixture was taken out after mixing for 5 minutes.

(iii) After cooling the rubber formulation at room temperature, the additive B shown in Table 1 was added in the 1.7 liter banbury mixer again, and the mixture was taken out after mixing for 50 seconds (the temperature of the rubber formulation at the time of taking out was set to 120° C. or less), and sheeting was performed on the 8-inch open roll to obtain the rubber formulation.

<Vulcanization>

The rubber formulation was placed in a test piece molding die, and vulcanization was performed in a steam vulcanization press (manufactured by Suetsugu Iron Works Co.) at a temperature of 150° C. under a pressure of 4.0 to 18.0 MPa for 10 minutes or 20 minutes to obtain a test piece.

The test piece mold used for the vulcanization was as follows.

A mold for measuring tensile strength and rolling resistance (Model: MP-124NJKAC; manufactured by Dumbbell Co.)

A mold for measuring dispersibility (Model: MPA-609AK; manufactured by Dumbbell Co.)

A mold for abrasion test (Model: MPL-309LAKC; manufactured by Dumbbell Co.)

<Mooney Viscosity>

The mooney viscosity was measured for the rubber formulation blended with additives A and B at an L-shape rotor rotational speed of 2 rpm and a measuring temperature of 125° C. with a mooney viscometer MODELVR-1130 (manufactured by Ueshima Seisakusho Co.) according to JIS6300-1 (Rubber, unvulcanized-Physical property—Part 1: Determination of Mooney viscosity and scorch time with Mooney viscometer). The mooney viscosity is the value read at 4 minutes after the rubber formulation was preheated at the test temperature for 1 minute and immediately the rotor rotated. The measurement result is an index relative to Reference Example 1 set as 100 (standard), and a lower index indicates a lower viscosity and a better processability.

<Dispersibility>

The dispersed state of the hydrous silica in the rubber was measured at the cross section of the test piece after the vulcanization with Dispergrader-1000 (manufactured by OptiGrate Co.) according to ISO11345. The degree of dispersion was evaluated as X value. A lower X value indicates the poor dispersibility of the hydrous silica in the rubber, and the reinforcing property (abrasion resistance, tensile strength) tends to deteriorate. The X value of 8.0 or more was evaluated as Good, and the X value of less than 8.0 was evaluated as Bad.

TABLE 1

| Composition | | Blending amount *1 | Remarks |
|---|---|---|---|
| Rubber component | Natural rubber | 100 | NR#1 (manufactured by JSR Co.) |
| Additive A | Hydrous silica | 50 | |
| | Stearic acid | 3.0 | Tsubaki (manufactured by Nippon Oil Co.) |
| | Silane coupling agent | Variable *2 | Bis-3-(ethoxysilyl)-propyl-tetrasulfide (Si-69 manufactured by Evonic Co.) |
| | Aroma oil | 10 | Diana Process Oil AH-16 (manufactured by Idemitsu Kosan Co.) |
| Additive B | Zinc flower | 5.0 | Two types of zinc oxide (manufactured by Sakai Chemical Co.) |
| | Anti-aging agent | 1.0 | N-(1,3-diethylbutyl)-N'-phenyl-p-phenylenediamine (Ozonone 6C manufactured by Ouchi Shinko Chemical Industrial Co.) |
| | Vulcanization accelerator 1 | 2.0 | 1,3-diphenylguanidine (Sanceler D manufactured by Ouchi Shinko Chemical Industrial Co.) |
| | Vulcanization accelerator 2 | 2.0 | N-cyclohexyl-2-benzothiazolylsulfenamide (Nocceler CZ manufactured by Ouchi Shinko Chemical Industrial Co.) |
| | Sulfur | 2.0 | Finely pulverized sulfur 200 mesh (manufactured by Tsurumi Chemical Industry Co.) |

*1 The unit in the table is phr (parts by mass per 100 parts by mass of the polymer).
*2 The blending amount of the silane coupling agent = CTAB specific surface area of the hydrous silica × 0.031 − 1.958

<Tensile Strength>

Tensile strength at break was measured with Tensilon Universal Tester RTG-1210 (manufactured by A&D Co.) according to JIS K 6251 (Rubber, vulcanized or thermoplastic-Determination of tensile stress-strain properties). The test piece was prepared by punching from a sheet-like vulcanized rubber composition into a target shape using a dumbbell-shaped No. 3 type. The measurement result is an index relative to Reference Example 1 set as 100 (standard), and a higher index indicates a stronger tensile strength at break.

<Abrasion Resistance>

The measurement was performed with Akron-type abrasion tester according to JIS K 6264-2 (Rubber, vulcanized or thermoplastic-Determination of abrasion resistance). The test piece having the diameter φ of 63.5 mm, the thickness of 12.7 mm, and the center hole of 12.7 mm was set, and a familiarization run was carried out at a tilt angle of 15°, a load of 27 N, and a rotation speed of the test piece of 75 rpm for 1,000 rpm, followed by the main test at the same conditions for 1,000 rpm to measure the abrasion loss. The measurement result was obtained as an index relative to Reference Example 1 set as 100 (standard). A higher index indicates a better abrasion resistance.

<Rolling Resistance>

A test piece was prepared by punching out a strip having the width of 1 mm or 2 mm and the length of 40 mm from a sheet-like vulcanized rubber composition. The viscoelasticity of the vulcanized rubber compositions was measured with Rheolograph-Solid L-1R (manufactured by Toyo Seiki Seisaku-sho Co.) to determine the loss tangent (tan δ) at a dynamic strain amplitude of 1%, a frequency of 50 Hz, and a temperature of 60° C. The value of the loss tangent (tan δ) was expressed in an index relative to Reference Example 1 set as 100 (standard). A smaller value indicates a smaller rolling resistance.

Example 1

The hydrous silica was produced through the following steps i) to v) and evaluated.

Steps i) to iii) below were carried out in a 240 liter stainless steel container equipped with a stirrer and a circulation pump.

In addition, a No. 3 sodium silicate having $SiO_2$ concentration of 12.8 mass %, $Na_2O$ concentration of 4.0 mass %, and $SiO_2/Na_2O$ molar ratio of 3.2 was used as the aqueous alkali silicate solution described below, and a concentrated sulfuric acid having the concentration of 98 mass % was used as the sulfuric acid.

i) the aqueous alkali silicate solution was added in 60 liters of hot water adjusted to 70° C. until pH became 11.5.

ii-1) only the sulfuric acid was dropped until pH became 10.5 while keeping the reaction temperature of 70° C.

ii-2) the dropping of the sulfuric acid was stopped, and the reaction temperature was raised from 70° C. to 90° C.

ii-3) 2.29 liters of the sulfuric acid and the aqueous alkali silicate solution having an adjusted flow rate were dropped at the same time over the period of 120 minutes while keeping pH at 10.5.

iii) the dropping of the aqueous alkali silicate solution was stopped, and only the sulfuric acid was dropped to reduce pH, and the dropping of the sulfuric acid was also stopped at the phase where pH became 3.0 to obtain a hydrous silica slurry while the reaction temperature was kept at 90° C.

iv) the obtained hydrous silica slurry was filtered with a filter press and washed with water to obtain a hydrous silica cake.

v) the hydrous silicate cake was subjected to re-slurrying by adding water again so that the $SiO_2$ concentration became 120 g/liter, and then dried using a spray dryer (Model: AN-40R type manufactured by Ashizawa Niroatomizer Co.) so that the water content became less than 9%, to obtain the hydrous silica.

Example 2

The hydrous silica was produced through the following steps i) to v) and evaluated. Note that the same conditions as in Example 1 were used for the apparatuses, alkaline silicate solution, and sulfuric acid.

i) the aqueous alkali silicate solution was added in 60 liters of hot water adjusted to 75° C. until pH became 11.5.

ii-1) only the sulfuric acid was dropped until pH became 10.5 while keeping the reaction temperature of 75° C.

ii-2) the dropping of the sulfuric acid was stopped, and the reaction temperature was raised from 75° C. to 95° C.

ii-3) 2.29 liters of the sulfuric acid and the aqueous alkali silicate solution having an adjusted flow rate were dropped at the same time over the period of 120 minutes while keeping pH at 10.5.

Thereafter, in steps iii) to v), the hydrous silica was produced under the same conditions as in Example 1 except that the reaction temperature was 95° C.

Example 3

The hydrous silica was produced through the following steps i) to v) and evaluated.

Note that the same conditions as in Example 1 were used for the apparatuses, alkaline silicate solution, and sulfuric acid.

i) the aqueous alkali silicate solution was added in 80 liters of hot water adjusted to 75° C. until pH became 11.5.

ii-1) only the sulfuric acid was dropped until pH became 10.5 while keeping the reaction temperature of 75° C.

ii-2) the dropping of the sulfuric acid was stopped, and the reaction temperature was raised from 75° C. to 95° C.

ii-3) 1.19 liters of the sulfuric acid and the aqueous alkali silicate solution having an adjusted flow rate were dropped at the same time over the period of 120 minutes while keeping pH at 10.5.

Thereafter, in steps iii) to v), the hydrous silica was produced under the same conditions as in Example 2.

Reference Example 1

An evaluation was performed, as an example of the hydrous silica, using Nipsil KQ (manufactured by Tosoh Silica Co.) having CTAB specific surface area of 200 $m^2$/g or more and commercially available as a hydrous silica for the rubber reinforcing fillers. The evaluation of each physical property of the natural rubber composition, such as abrasion resistance and rolling resistance, was performed by comparing the index relative to the physical property value in Reference Example 1 as the standard (100).

Comparative Example 1

The hydrous silica having CTAB specific surface area of 250 $m^2$/g was produced with the same composition as that in the method described in Example 5 of JP2017-514773

(Patent Literature 1), and evaluated. The same apparatus (the reaction container) as in Example 1 was used for production, and the neutralization reaction of the hydrous silica was performed on a scale of one-eleventh with respect to Example 5 in JP2017-514773. After filtering through the filter press to obtain the hydrous silica cake, the cake was dried in the manner of step v) of Example 1 so that the water content became less than 9%.

The physical properties and the rubber blending test results for the hydrous silicas of Examples 1 to 3, Reference Example 1 and Comparative Example 1 are shown in Table 2.

TABLE 2

| | | | EXAMPLES | | | Reference Example | Comparative Example |
|---|---|---|---|---|---|---|---|
| | | | 1 | 2 | 3 | 1 | 1 |
| Physical properties of hydrous silica | | Unit | | | | Standard | |
| CTAB specific surface area | | $m^2/g$ | 251 | 222 | 311 | 205 | 250 |
| Pore volume by mercury press-in method (pore radius 1.9 to 100 nm) | | $cm^3/g$ | 1.93 | 1.81 | 1.79 | 1.65 | 1.59 |
| Volume particle size distribution | Volume average particle diameter D50 | μm | 8.4 | 8.6 | 11.2 | 7.9 | 13.3 |
| | Cumulative value from 4.0 μm to 35.0 μm | % | 88.5 | 89.5 | 85.3 | 72.3 | 75.8 |
| BET specific surface area | | $m^2/g$ | 257 | 236 | 315 | 222 | 250 |
| Electrical conductivity | | μS/cm | 31 | 40 | 19 | 146 | 408 |
| pH | | | 6.5 | 6.1 | 6.2 | 6.1 | 6.6 |
| Water content | | % | 5.2 | 4.1 | 6.1 | 7.1 | 4.6 |
| Rubber composition | Mooney viscosity | Index | 105 | 99 | 106 | 100 | 118 |
| | Dispersibility | X value | 8.8 | 8.5 | 8.3 | 9.3 | 7.4 |
| | | | GOOD | GOOD | GOOD | GOOD | BAD |
| | Abrasion resistance | Index | 141 | 123 | 115 | 100 | 109 |
| | Tensile strength | Index | 109 | 103 | 99 | 100 | 92 |
| | Rolling resistance | Index | 76 | 76 | 86 | 100 | 92 |

As shown in Table 2, all the hydrous silicas of Examples have CTAB specific surface area of 220 to 350 $m^2/g$, the pore volume over the range of pore radius 1.9 to 100 nm measured by mercury press-in method of 1.7 to 2.0 $cm^3/g$, the volume average particle diameter D50 in the volume particle size distribution of 5.0 to 12.0 μm, and the cumulative value of the hydrous silica particles over the range of 4.0 to 35.0 μm in the volume particle size distribution of 80% or more. When these hydrous silicas were blended into the rubber containing the natural rubber, the rolling resistance could be reduced while maintaining or improving the reinforcing property (abrasion resistance, tensile strength) as compared with the case where the conventional hydrous silicas shown in Reference Example 1 and in Comparative Example 1 were used.

INDUSTRIAL APPLICABILITY

The present invention is useful in the field of the hydrous silica for rubber reinforcing fillers. In particular, the present invention is useful as the hydrous silica for rubber reinforcing fillers of rubber products comprising the natural rubber.

The invention claimed is:

1. A hydrous silica for rubber reinforcing fillers having CTAB specific surface area in a range of 220 $m^2/g$ to 350 $m^2/g$ and a pore volume over a range of pore radius 1.9 nm to 100 nm, as measured by a mercury press-in method, in a range of 1.7 $cm^3/g$ to 2.0 $cm^3/g$, wherein a volume average particle diameter D50 in a volume particle size distribution measured by a laser diffraction method for the slurry obtained by dispersing 50 ml of a hydrous silica slurry adjusted to 4 mass % with an ultrasonic homogenizer at an output of 140 W for 10 minutes is in a range of 5.0 μm to 12.0 μm, and a cumulative value of hydrous silica particles over a range of 4.0 μm to 35.0 μm in the volume particle size distribution is 80% or more.

2. The hydrous silica for rubber reinforcing fillers according to claim 1, wherein the D50 is 7.0 μm to 12.0 μm and the cumulative value of the hydrous silica particles over the range of 4.0 μm to 35.0 μm in the volume particle size distribution is 85% or more.

3. The hydrous silica for rubber reinforcing fillers according to claim 1, wherein a BET specific surface area of the hydrous silica is in a range of 230 $m^2/g$ to 350 $m^2/g$.

4. The hydrous silica for rubber reinforcing fillers according to claim 1, wherein a pH of the 4 mass % slurry is in a range of 5 to 8, an electrical conductivity of a filtrate of the 4 mass % slurry is 1,000 μS/cm or less, and a water content of the 4 mass % slurry is 9 mass % or less.

5. The hydrous silica for rubber reinforcing fillers according to claim 1, configured for reinforcing and filling rubber of a rubber component containing a natural rubber.

6. A rubber composition containing the hydrous silica according to claim 1 and a rubber component containing a natural rubber.

7. The rubber composition according to claim 6, wherein the rubber component contains 70 mass % or more of the natural rubber.

8. The rubber composition according to claim 6, which contains 5 parts to 100 parts by mass of the hydrous silica per 100 parts by mass of the rubber component.

9. The hydrous silica for rubber reinforcing fillers according to claim 2, wherein a BET specific surface area of the hydrous silica is in a range of 230 $m^2/g$ to 350 $m^2/g$.

10. The hydrous silica for rubber reinforcing fillers according to claim 2, wherein a pH of the 4 mass % slurry is in a range of 5 to 8, an electrical conductivity of a filtrate of the 4 mass % slurry is 1,000 µS/cm or less, and a water content of the 4 mass % slurry is 9 mass % or less.

11. The hydrous silica for rubber reinforcing fillers according to claim 3, wherein a pH of the 4 mass % slurry is in a range of 5 to 8, an electrical conductivity of a filtrate of the 4 mass % slurry is 1,000 µS/cm or less, and a water content of the 4 mass % slurry is 9 mass % or less.

12. The hydrous silica for rubber reinforcing fillers according to claim 2, configured for reinforcing and filling rubber of a rubber component containing a natural rubber.

13. The hydrous silica for rubber reinforcing fillers according to claim 3, configured for reinforcing and filling rubber of a rubber component containing a natural rubber.

14. The hydrous silica for rubber reinforcing fillers according to claim 4, configured for reinforcing and filling rubber of a rubber component containing a natural rubber.

15. A rubber composition containing the hydrous silica according to claim 2 and a rubber component containing a natural rubber.

16. A rubber composition containing the hydrous silica according to claim 3 and a rubber component containing a natural rubber.

17. A rubber composition containing the hydrous silica according to claim 4 and a rubber component containing a natural rubber.

18. The rubber composition according to claim 15, wherein the rubber component contains 70 mass % or more of the natural rubber.

19. The rubber composition according to claim 16, wherein the rubber component contains 70 mass % or more of the natural rubber.

20. The rubber composition according to claim 7, which contains 5 parts to 100 parts by mass of the hydrous silica per 100 parts by mass of the rubber component.

* * * * *